(12) United States Patent
McKenna

(10) Patent No.: US 8,305,032 B2
(45) Date of Patent: Nov. 6, 2012

(54) CENTRALIZED LOAD MANAGEMENT FOR USE IN CONTROLLABLY RECHARGING VEHICLES EQUIPPED WITH ELECTRICALLY POWERED PROPULSION SYSTEMS

(75) Inventor: Daniel Bernard McKenna, Vail, CO (US)

(73) Assignee: Lava Four, LLC, Vail, CO (US)

( * ) Notice: Subject to any disclaimer, the term of this patent is extended or adjusted under 35 U.S.C. 154(b) by 444 days.

(21) Appl. No.: 12/436,572

(22) Filed: May 6, 2009

(65) Prior Publication Data

US 2010/0145540 A1    Jun. 10, 2010

Related U.S. Application Data

(63) Continuation-in-part of application No. 12/329,349, filed on Dec. 5, 2008, now abandoned, and a continuation-in-part of application No. 12/329,368, filed on Dec. 5, 2008, now abandoned, and a continuation-in-part of application No. 12/329,389, filed on Dec. 5, 2008, now abandoned.

(51) Int. Cl.
  *H02J 7/14* (2006.01)
  *H02J 7/00* (2006.01)
  *H02J 7/04* (2006.01)

(52) U.S. Cl. ........ 320/104; 320/109; 320/132; 320/137; 320/140; 320/152; 903/903; 903/907

(58) Field of Classification Search .................. 320/104, 320/109
See application file for complete search history.

(56) References Cited

U.S. PATENT DOCUMENTS

| | | | |
|---|---|---|---|
| 4,532,418 A | 7/1985 | Meese et al. | |
| 5,297,664 A | 3/1994 | Tseng et al. | |
| 5,461,299 A | 10/1995 | Bruni | |
| 5,523,666 A * | 6/1996 | Hoelzl et al. | 320/109 |
| 5,648,906 A | 7/1997 | Amirpanahi | |
| 2007/0126395 A1 | 6/2007 | Suchar | |
| 2009/0062967 A1 * | 3/2009 | Kressner et al. | 700/286 |
| 2009/0174365 A1 * | 7/2009 | Lowenthal et al. | 320/109 |
| 2010/0133900 A1 * | 6/2010 | King | 307/9.1 |

FOREIGN PATENT DOCUMENTS

EP    0021370 B1    1/1981

* cited by examiner

*Primary Examiner* — Edward Tso
*Assistant Examiner* — Ahmed Omar
(74) *Attorney, Agent, or Firm* — Patton Boggs LLP

(57) ABSTRACT

The Centralized Vehicle Load Management System is hierarchical in nature in that it detects and remediates an overload which can be highly localized at one or more electrical substations or an overload which is widely distributed as a cumulative set of sub-critical loads. The Centralized Vehicle Load Management System operates to determine the load presented to the Electric Power Grid by vehicles which are served by service disconnects which are located at a plurality of points on the Electric Power Grid. The Centralized Vehicle Load Management System regulates the demands presented by the vehicles to the E-Grid thereby to spread the load presented to the Electric Power Grid over time to enable the controllable charging of a large number of vehicles.

14 Claims, 9 Drawing Sheets

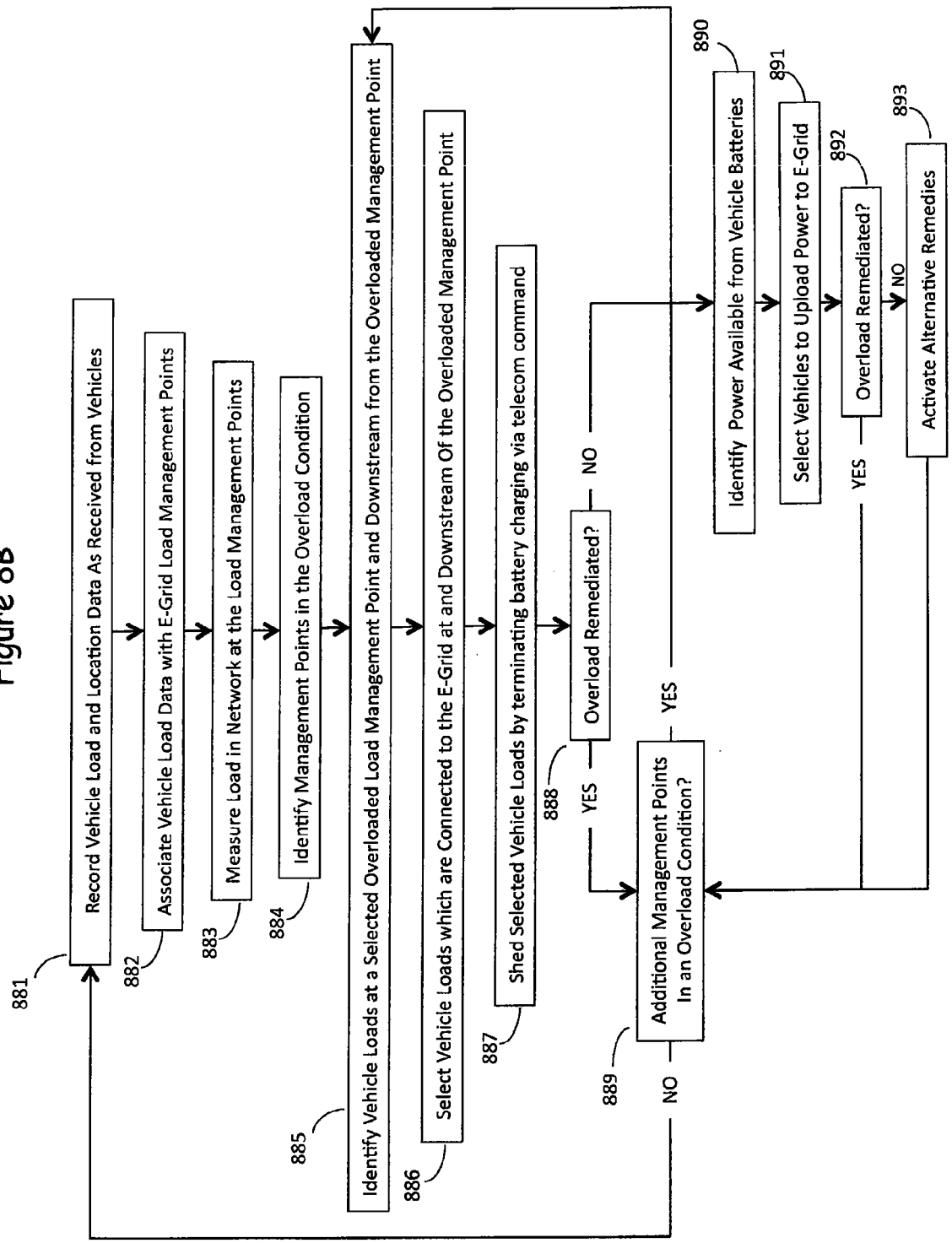

CENTRALIZED LOAD MANAGEMENT FOR USE IN CONTROLLABLY RECHARGING VEHICLES EQUIPPED WITH ELECTRICALLY POWERED PROPULSION SYSTEMS

CROSS-REFERENCE TO RELATED APPLICATIONS

This Application is a continuation-in-part of U.S. application Ser. No. 12/329,349 tided "Self-Identifying Power Source For Use In Recharging Vehicles Equipped With Electrically Powered Propulsion Systems" filed 5 Dec. 2008, and U.S. application Ser. No. 12/329,368 titled "System For On-Board Metering Of Recharging Energy Consumption In Vehicles Equipped With Electrically Powered Propulsion Systems" filed 5 Dec. 2008, and U.S. application Ser. No. 12/329,389 titled "Network For Authentication, Authorization, and Accounting Of Recharging Processes For Vehicles Equipped With Electrically Powered Propulsion Systems" filed 5 Dec. 2008. In addition, this Application is related to a US Application tided "Sub-Network Load Management For Use In Recharging Vehicles Equipped With Electrically Powered Propulsion Systems", a US Application titled "Dynamic Load Management For Use In Recharging Vehicles Equipped With Electrically Powered Propulsion Systems", and a US Application tided "Intra-Vehicle Charging System For Use In Recharging Vehicles Equipped With Electrically Powered Propulsion Systems", all filed on the same date as the present application and incorporating the disclosures of each herein.

FIELD OF THE INVENTION

This invention relates to a system for controllably delivering electrical power for use in recharging vehicles equipped with electrically powered propulsion systems, where each vehicle connected to the Electric Power Grid has the following key attributes: access to a communication network, a vehicle location identification for vehicle energy consumption billing purposes, and a vehicle power load representative of at least the present demand placed on the Electric Power Grid by the vehicle.

BACKGROUND OF THE INVENTION

It is a problem in the field of recharging systems for vehicles that are equipped with electrically powered propulsion systems to bill the vehicle operator for energy consumption where the Electric Power Grid is used as the source of power to charge the vehicular battery banks. Presently, each outlet that is served by a local utility company is connected to the Electric Power Grid by an electric meter which measures the energy consumption of the loads that are connected to the outlet. The utility company bills the owner of the premises at which the outlet is installed for the total energy consumption for a predetermined time interval, typically monthly. Recharging a vehicle which is equipped with an electrically powered propulsion system results in the premises owner errantly being billed for the recharging and the vehicle owner not being billed at all. An exception to this scenario is where the premises owner is paid a flat fee by the vehicle owner for the use of the outlet to recharge the vehicular battery banks.

Electric transportation modes typically take the form of either a pure battery solution where the battery powers an electric propulsion system, or a hybrid solution where a fossil fuel powered engine supplements the vehicle's battery bank to either charge the electric propulsion system or directly drive the vehicle. Presently, there is no electricity re-fueling paradigm where a vehicle can plug in to the "Electric Power Grid" while parked at a given destination and then recharge with sufficient energy stored in the vehicular battery banks to make the trip home or to the next destination. More to the point, the present "grid paradigm" is always "grid-centric"; that is, the measurement and billing for the sourced electricity is always done on the grid's supply side by the utility itself. One example of a system that represents this philosophy is the "municipal parking meter apparatus" where an electric meter and credit card reader is installed at every parking meter along a city's streets to directly bill vehicle owners for recharging their vehicular battery banks. Not only is this system very expensive to implement, but it remains highly centralized and is certainly not ubiquitous.

Thus, the inherent problems with the present centralized vehicular charging architecture include:
infrastructure cost,
lack of ubiquity in the infrastructure's extent,
extensive time to deploy a nationwide system,
can't manage/control access to electricity without a per outlet meter,
no ubiquity of billing for downloaded electricity,
no method to assure a given utility is properly paid,
no method to provide revenue sharing business models,
no methods to manage and prevent fraud,
incapable of instantaneous load management during peak loads,
incapable of load management on a block by block, sector by sector load, or city-wide basis, and
incapable of billing the energy "downloaded" to a given vehicle, where a given vehicle is random in its extent, and where the vehicle is plugged into the grid is also random in its extent.

What is needed is a solution that can be deployed today, that doesn't require a whole new infrastructure to be constructed, is ubiquitous in its extent, and offers complete control by the utility to manage a delivered load; that is, a system that is low in cost and low in deployment risk where any vehicle and any utility can easily be integrated into the Central Load Management architecture proposed herein.

The above-noted patent applications: U.S. application Ser. No. 12/329,349 titled "Self-Identifying Power Source For Use In Recharging Vehicles Equipped With Electrically Powered Propulsion Systems" filed 5 Dec. 2008, and U.S. application Ser. No. 12/329,368 titled "System For On-Board Metering Of Recharging Energy Consumption In Vehicles Equipped With Electrically Powered Propulsion Systems" filed 5 Dec. 2008, and U.S. application Ser. No. 12/329,389 titled "Network For Authentication, Authorization, and Accounting Of Recharging Processes For Vehicles Equipped With Electrically Powered Propulsion Systems" filed 5 Dec. 2008 collectively describe an E-Grid concept for use in providing power to vehicles which include a propulsion system powered, at least in part, by electric power, at least some of which is stored onboard the vehicle in an electric power storage apparatus.

A key element of the conceptual "E-Grid" is not unlike the problem faced by early cellular telephone operators and subscribers. When a cellular subscriber "roamed" out of their home "network", they couldn't make phone calls, or making phone calls was either extremely cumbersome or expensive or both. Similarly, when a vehicle drives out of their home area, there needs to be a process for allowing seamless charging of the vehicle battery banks and billing for the recharging with a "foreign" or non-home utility. The E-Grid architecture has a centralized billing structure that manages the "roaming"

vehicle as it "self-charges" at virtually any power source/ electric outlet in a seamless yet ubiquitous manner anywhere a given utility is connected to the "E-Grid architecture". This includes the full AAA functionality as shown in the "Utility Service Center"—Authentication, Authorization, and Accounting.

A key component of the E-Grid architecture is to place the "electric meter" in the vehicle itself to eliminate the need to modify the Electric Power Grid. The Self-Identifying Power Source provides the vehicle's electric meter with a unique identification of the power source to enable the vehicle to report both the vehicle's energy consumption and the point at which the energy consumption occurred to the utility company via the ubiquitous communications network.

An advantage of this architecture is that the vehicle is in communication with the utility company, which can implement highly dynamic load management, where any number of vehicles can be "disconnected" and "re-connected" to the Electric Power Grid to easily manage peak load problems for geographic areas as small as a city block or as large as an entire city or even a regional area. The Centralized Vehicle Load Management System is bi-directional in its nature—in that the batteries could be used as load peak power sources for the utility—which would be significantly less expensive than building a peaking plant that is used, for example. at 0.1% per year.

The "E-Grid" architecture enables a vehicle to plug in anywhere, "self-charge", and be billed in a seamless fashion, regardless of the utility, regardless of the vehicle, regardless of the location, regardless of the time. The utility for that given downloaded charge receives credit for the electricity "downloaded" across their network, whether that customer is a "home" customer or a "roaming" customer. The "owner" of the electrical outlet receives credit for the power consumed from their "electrical outlet". In addition, if a given customer has not paid their E-Grid bill, the system can directly manage access to the grid to include rejecting the ability to charge or only allowing a certain charge level to enable someone to get home. The E-Grid architecture can have account managed billing, pre-paid, and post-paid billing paradigms. The billing is across any number of electric utility grids, and the E-Grid architecture is completely agnostic to how many utility suppliers there are or where they are located. So too, the E-grid architecture is agnostic to the charging location, where said charging location does not require a meter and does not require telecommunications capability.

The compelling societal benefit of the E-Grid architecture is that it is possible to deploy it today without a major change in present infrastructure or requiring new infrastructure. Virtually every electrical outlet, no matter where located, can be used to charge a vehicle, with the bill for that charge going directly to the given consumer, with the owner of the electrical outlet getting a corresponding credit, with the payment for electricity going directly to the utility that provided the energy—all in a seamless fashion.

One problem faced by the E-Grid is that typically a number of vehicles arrive at a destination in close temporal proximity, connect to the power sources served by one or more service disconnects, and concurrently request service. Once their batteries are charged, there is no load placed on the service disconnects until these vehicles depart and other vehicles arrive to be recharged. Given this high demand scenario, each service disconnect can serve only a limited number of vehicles at a time if they concurrently demand the delivery of power, and an electric substation can only serve a limited number of vehicles which are served by the service disconnects connected to the electric substation. This is a peak load issue, where the existing service disconnects are unable to manage a plurality of concurrently received requests for service and, therefore, are limited in the number of vehicles that can be served and cumulatively can cause overloads at the electric substation level or elsewhere within the E-Grid.

BRIEF SUMMARY OF THE INVENTION

The present Centralized Load Management System For Use In Controllably Recharging Vehicles Equipped with Electrically Powered Propulsion Systems (termed "Centralized Vehicle Load Management System" herein) manages delivery of the power consumed by the recharging of the vehicular battery banks in order to prevent overloads of the Electric Power Grid. The Centralized Vehicle Load Management System is hierarchical in nature, in that it detects and remediates overloads which can appear at different levels of the Electric Power Grid and operates on these various levels in an orderly and efficient manner. The overloads can be highly localized, such as at one or more electrical substations, or an overload can be widely distributed, such as a cumulative set of sub-critical loads presented by a large number of electrical substations to associated feeders to collectively cause an overload at the feeder, or any other combination of load conditions which result in one or more overload situations.

The solution to the overload problem which is provided herein uses a novel communication paradigm, onboard vehicle metering capabilities, together with location information (derived by GPS, RFID, or PLC (Power Line Carrier) plug identification) which informs the utility where a given battery being charged is located within the extent of the utility's power grid or sub-grid. By associating these elements, a true Centralized Vehicle Load Management System thereby is created—all of the necessary information, command, and control data is fed directly into a given utility's load management system. Nothing new needs to be created or deployed. The cost to implement such a system is just a few dollars per vehicle, and the cost to operate the load management system is fractions of pennies in telecommunication cost per vehicle being load managed.

A number of key innovative steps are necessary to enable the E-Grid architecture with Centralized Vehicle Load Management System to overcome cost issues, deployment times, and ubiquitous access by any vehicle at any charging plug. First, when charging vehicle batteries, the electric meter is relocated downstream to the vehicle itself. This means that, whenever the vehicle needs to recharge its batteries, there is a process to measure the amount of electricity "downloaded and purchased" at the vehicle itself. The amount of electricity is measured in kilowatts, for instance, over a period of time— giving the energy units of power per time. Therefore, an intelligent meter that stores and records the amount of electricity purchased at a given time over a given charging period is provisioned onboard the vehicle. A second innovative element is to identify where the vehicular battery is being charged: the spatial or positional information of where the battery is located—this is done via a variety of means, in either a singular or redundant fashion; methods such as GPS vehicle location relative to the utilities grid's map, RFID identification of a given charging plug, Power Line Carrier communication from the plug to the module in the vehicle, and so on. The location information is important for billing purposes, but it also is essential for load management operations, should that become necessary. The third innovative element involves an intelligent communication system architecture that integrates or ties together all of the vehicles that are charging with the utility's load management system, as well as with the utility's billing system. In concert, this creates the E-Grid Centralized Vehicle Load Management System.

The Centralized Vehicle Load Management System provides a more global approach and regulates the demands presented by the vehicles to the Electric Power Grid thereby to spread the load presented to the Electric Power Grid over time to enable controllable charging of a large number of vehicles. The vehicular battery banks can also act as a power source to enable the delivery of power to vehicles whose battery banks are depleted from vehicles whose vehicular battery banks are substantially charged. Thus, the vehicular battery banks of some of the vehicles can be used to replace or supplement the traditional power sources to enable rapid recharging of the vehicles.

The implementation of the Centralized Vehicle Load Management System can include intelligent Self-Identifying Power Sources, which can be controlled to deliver power on a basis determined by the Centralized Vehicle Load Management System, and/or the use of intelligent Self-Metering Vehicles, which can be controlled to request power on a basis determined by the Centralized Vehicle Load Management System, or combinations of both. In addition, the availability of information from the Self-Metering Vehicles relating to: power required to recharge, recharge current handling capacity, estimated time of connection, amount of energy presently stored in the battery, or class of service for which the vehicle owner has contracted, all enhance the operation of the Centralized Vehicle Load Management System.

BRIEF DESCRIPTION OF THE DRAWINGS

FIGS. 8A and 8B illustrate, in flow diagram form, the operation of the present Centralized Vehicle Load Management System for managing the load presented to the Electric Grid on a block, local, and/or regional basis.

DETAILED DESCRIPTION OF THE INVENTION

Figure 1:
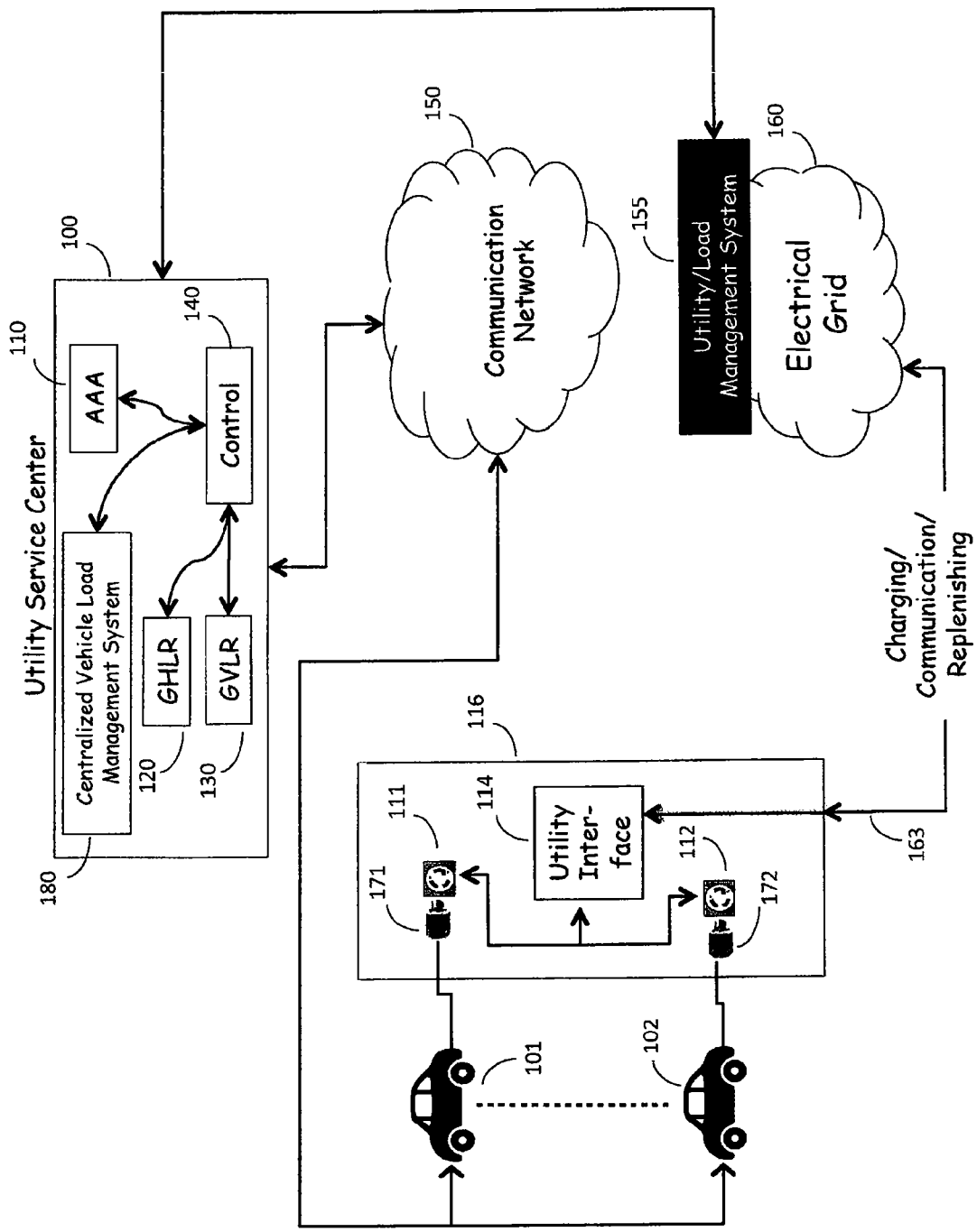
FIG. 1 illustrates, in block diagram form, the E-Grid network architecture, including interconnected communication networks with a unified authentication, authorization, and accounting structure.
Figure 2:
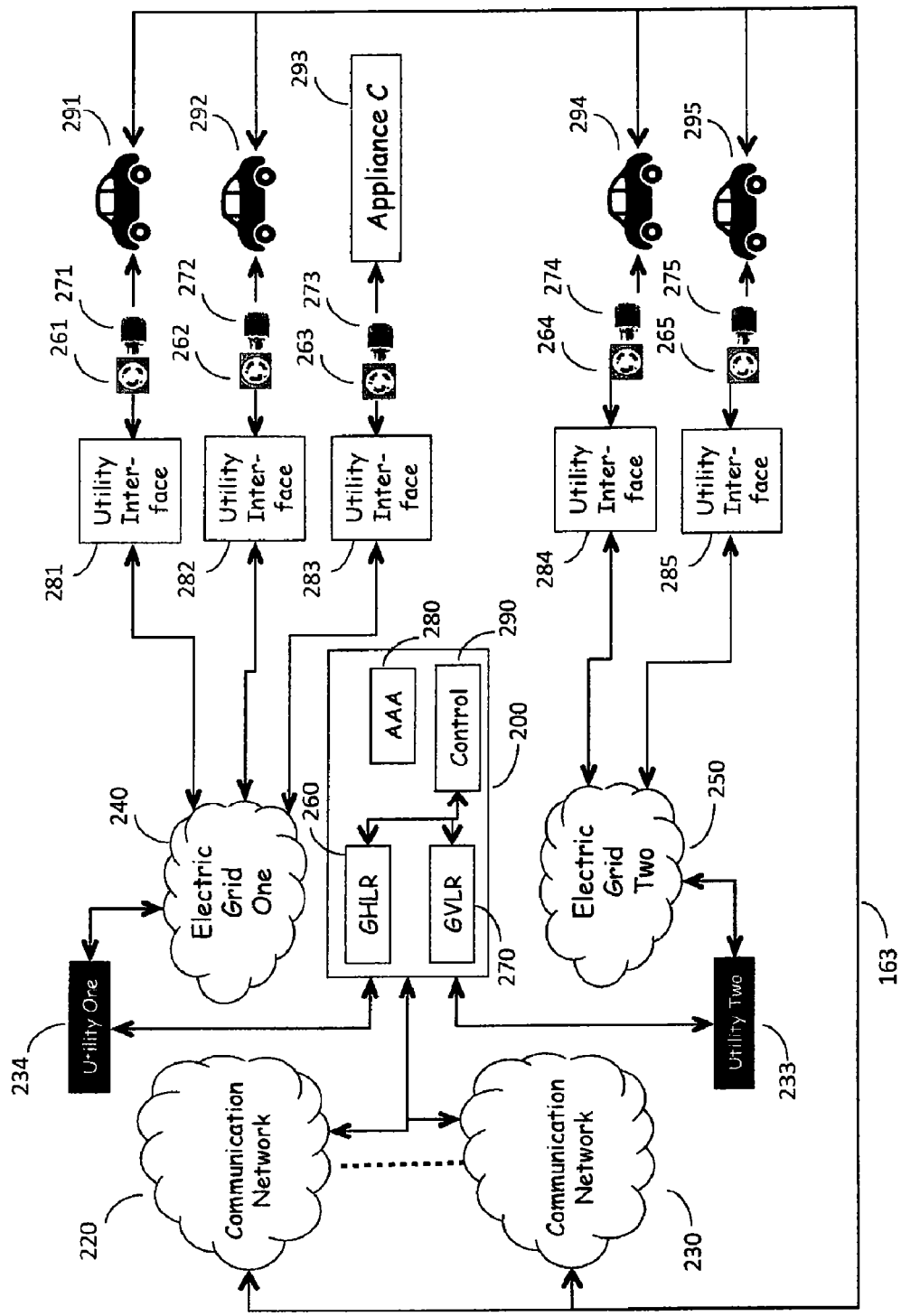
FIG. 2 illustrates, in block diagram form, a more detailed embodiment of the E-Grid network architecture shown in FIG. 1 which discloses multiple utility companies.

FIG. 1 illustrates, in block diagram form, the E-Grid network architecture, including interconnected communications networks with a unified authentication, authorization, and accounting structure, while FIG. 2 illustrates, in block diagram form, a more detailed embodiment of the E-Grid network architecture shown in FIG. 1. In the following description, the term "Vehicle" is used; and this term represents any mechanism which includes a propulsion system powered, at least in part, by electric power, at least some of which is stored onboard the vehicle as electrical energy in an electric power storage apparatus, as well as any electric power consuming loads incorporated into, transported by, or associated with any type of vehicle, whether or not these types of vehicles are electrically powered.

Traditional Electric Power Grid

Electric Power Grid 160 shown in FIG. 1 represents the source of electric power as provided by multiple utility companies which serve a wide geographic area. For the purpose of illustration, the present description focuses on a single Utility 155 which serves a particular geographic area (service area) and provides electric power to a multitude of customers via a utility interface 114 which typically comprises an electric meter which is installed at the customer's facilities 116 and an associated service disconnect. Nothing herein limits the physical elements contained within utility interface 114 to include that an electric meter may not be a part of utility interface 114 in certain applications.

Figure 5:
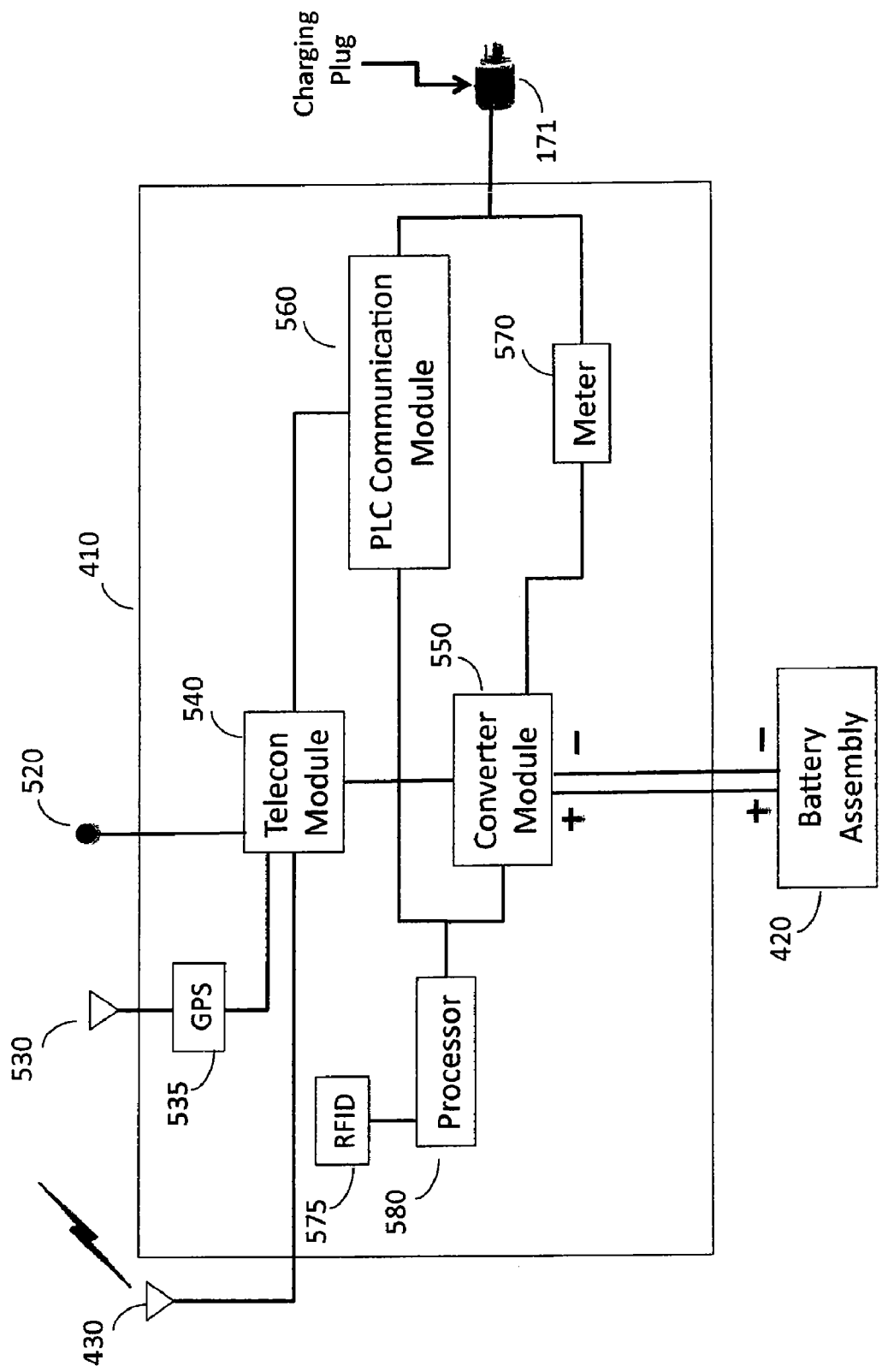
FIG. 5 illustrates, in block diagram form, a detailed block diagram of the CCC module.

The electric meter in utility interface 114 serves to measure the energy consumption by the various outlet connected loads, such as Vehicles 101, 102 and fixed loads (not shown) which are connected to the customer's electric meter via a customer's service disconnect (circuit breaker panel), which is part of the utility interface 114 for the purpose of this description. These elements represent the existing electric power delivery infrastructure. The arrow shown at the bottom of FIG. 1 (labeled 163) highlights the fact that the connection to Electric Power Grid 160 is bidirectional, in that electric power traditionally flows from the Electric Power Grid 160 to the utility interface 114 and thence to the customer's loads—Vehicles 101, 102—but also can flow in the reverse direction, from the vehicular battery banks of Vehicles 101, 102, through the utility interface 114 to the Electric Power Grid 160; and these conductors can also carry Power Line Carrier (PLC) communications, such as data which identifies electrical outlet 111, via plug 171 to Vehicle 101. The PLC communication network could also be used as an alternate communication pathway to the Utility Service Center 100 for Authentication, Authorization, and Accounting functionality. Alternate means for identifying a vehicle's location (battery location) is shown in FIG. 5 where GPS or possibly differential GPS is used to realize a high degree of location accuracy.

Utility Service Center

Communication Network 150 is the preferred communication medium which enables the Vehicles 101, 102 to communicate with Utility Service Center 100 to implement the Vehicle registration and billing processes of Control Processor 140 via Grid Home Location Register (GHLR) 120 and Grid Visitor Location Register (GVLR) 130. The Centralized Vehicle Load Management System 180 is either located at Utility 155, where it has connectivity to the Utility Service Center 100, or is a process which can execute on the Control Processor 140 located in the Utility Service Center 100. For the purpose of this description, the Centralized Vehicle Load Management System 180 is described as being part of the Control Processor 140 in the Utility Service Center 100. The Centralized Vehicle Load Management System 180 implements any load management function defined by the associated Utility 155, such as: stopping or controlling the rate that a given battery is charging, whether on an individual battery basis, an entire city block of batteries basis, all batteries then connected to the grid basis, or other identified grouping of batteries, such as by present level of charge stored in the battery. The Centralized Vehicle Load Management System 180 can also command certain batteries to become power sources and to push energy back to the grid. This previous description in no way limits the various nuances of charging and pushing energy that can occur from N-number of vehicle batteries then connected to the grid as the grid itself is seeing varying loads morph across its extent. The vehicular charging architecture presented can be interfaced with any existing load management system that a given electric utility already has already deployed or may deploy in the future. This is truly a ubiquitous solution that transcends any given electric utility or the type of load management system they may have adopted. The key reason for this ubiquity is that the on/off or partial charge control resides in the vehicle itself; and a simple communication from the Utility 155 to the Utility Service Center 100 to vehicle 101, for example, now causes the desired action to take place at vehicle 101 or any vehicle that is registered with the Centralized Vehicle Load Management System 180. The Communication Network 150 comprises any technology: cellular, WiFi, wired Public Switched Telephone Network (PSTN), Internet, etc. The Grid Home Location Register 120 and Grid Visitor Location Register 130 are further connected to the Authentication, Authorization, and Accounting System 110 (AAA System 110). The communication mode for the Vehicles 101, 102 can be wireless, wired (such as via Communication Network 150), or via the Electric Power Grid 160 using Power Line Carrier as previously mentioned. For the purpose of illustration, a wireless link to the Communication Network 150 is used in this embodiment, although the other modes can be used.

The Vehicles 101, 102 first communicate with Communication Network 150 in well-known fashion to link to Utility Service Center 100 where the Control Processor 140 accesses the Location Registers 120 and 130. These devices contain the user profile for the account holder, including the identification of the home utility company, billing account, and maximum authorized credit, where the user is authorized to charge, identification of any value added services that the user subscribes to, and the like. When registering with the Utility Service Center 100, the Vehicles 101, 102 first seek to register with the Grid Home Location Register 120 if in their home territory (i.e., within the territory served by their residence's electric utility provider). If Vehicle 101 is traveling outside of its home territory, it would first register with the serving utility's Grid Visitor Location Register 130 which would then communicate with the user's Grid Home Location Register 120 to confirm that the user is a "real" customer, and all of the data stored in the Grid Home Location Register 120 about a particular customer is copied to the Grid Visitor Location Register 130 while the Vehicle 101 is in the "roaming" territory. Communications via network 150 (typically via wireless means) would let the Vehicles 101, 102 know whether they are in the home territory or whether they are roaming (not unlike how cellular phone networks operate today). After successful registration, the AAA System 110 begins to manage the charging transaction.

At AAA System 110, a number of essential functions occur. All Vehicles seeking to receive electrical power from Electric Power Grid 160 to charge the vehicular battery banks (also termed "electric energy storage apparatus") are first authenticated, then authorized, and billed for the energy consumed via the charging process. The term "Authentication" means that a device is valid and permitted to access the Electric Power Grid 160 (the authorization phase of AAA). AAA System 110 also manages the accounting process, ensuring that all bills go to the correct vehicle owner, the electric utility gets paid for the electricity that it supplied, and the owner of utility interface 114 is credited with the electricity that flowed through utility interface 114 to recharge the vehicular battery banks. There could also be revenue share models where a facility owner could get a portion of the overall revenue for providing physical access (i.e., an electrical plug-in location). AAA System 110 is seen as a more central device, to be shared among a number of electric utilities, although there is nothing from preventing each utility having its own AAA System.

Multi-Utility Embodiment

FIG. 1 is in reality a multidimensional network in which N electric utilities are served by M Electric Power Grids with corresponding communication networks, as shown in FIG. 2. Electric Power Grids 240, 250 shown in FIG. 2 represent the source of electric power as provided by multiple utility companies which serve a wide geographic area and provide electric power to a multitude of customers via utility interfaces 281-285. The utility interfaces 281-285 serve to measure the energy consumption by the various outlet connected loads, such as Vehicles 291-295. These elements represent the existing, present day electric power delivery infrastructure as described above. Electric power traditionally flows from the Electric Power Grid 240, 250 to the utility interfaces 281-285 via the Electric Power Grid and thence to the customer's loads—Vehicles 291-295 via plug 271-275-outlet 261-265 combinations, but power also can flow in the reverse direction, from the vehicular battery banks of Vehicles 291-295 through the utility interfaces 281-285 to the Electric Grids 240, 250.

Communication Networks 220, 230 are the communication mediums which enable the Vehicles 291-295 to communicate with Utility Service Center 200 which, as noted above, implements the vehicle registration process via Grid Home Location Register (GHLR) 260 and Grid Visitor Location Register (GVLR) 270. The Grid Home Location Register 260 and Grid Visitor Location Register 270 are further connected to the Authentication, Authorization, and Accounting System 280 (AAA System 280). The communication mode for the Vehicles 291-295 can be wireless, wired, or via the Electric Power Grid, as previously discussed. For the purpose of illustration, a wireless link to the Communication Networks 220, 230 is used in this embodiment, although the other communication modes can be used.

Self-Identifying Power Source

Figure 6:
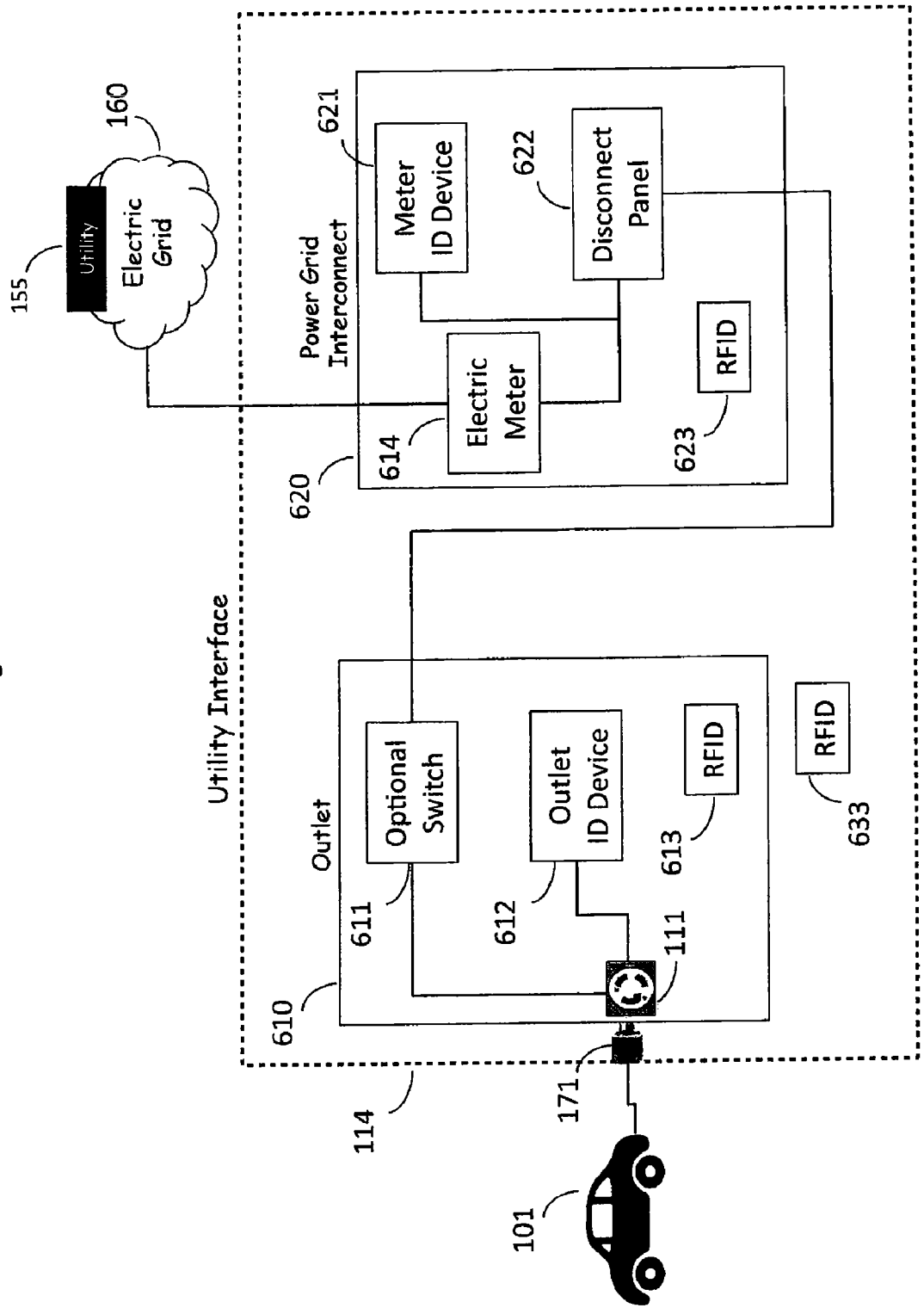
FIG. 6 illustrates an embodiment of the Self-Identifying Power Source for use in the E-Grid system.

FIG. 6 illustrates an embodiment of the present Self-Identifying Power Source 116 for use in the E-Grid system. The Self-Identifying Power Source 116 can be implemented in a variety of ways, and FIG. 6 illustrates the components that can be used to produce and transmit a unique identification of the power source to a vehicle for energy consumption credit and billing purposes. As noted above, it is a problem in the field of recharging systems for vehicles equipped with electrically powered propulsion systems to bill the vehicle operator or the financially responsible party for the energy consumption where the Electric Power Grid is used as the source of power to charge the vehicular battery banks. Presently, each outlet (or jack or inductive power source) that is served by a local utility company is connected to the Electric Power Grid by a utility meter which measures the energy consumption of the loads that are connected to the outlet. The utility company bills the owner of the premises at which the outlet is installed for the total energy consumption for a predetermined time interval, typically monthly.

The solution to this problem is to have the vehicle self-meter its energy consumption in recharging the vehicular battery banks and report the energy consumption to the utility company that serves the power source to which the vehicle is connected. The utility company then can bill the vehicle owner and simultaneously credit the power source for this consumption. In implementing this paradigm, the power source identification can be implemented at various layers of the power management network. The outlet 111 to which the Vehicle 101 connects can identify itself, the utility interface 114 (such as a utility meter) can identify itself, or the premises at which the outlet 111 and the utility interface 114 (in this example a meter 614) are installed and physically located can be identified. All of these scenarios are effective to enable the utility company to credit the owner of the power source with the power consumed by Vehicle 101.

Power Source Identification—Outlet Level

A first implementation of the power source identification is at the outlet level, where the self-identifying element comprises an electrical outlet 111 having a housing into which are molded a plurality of conductors that function to conduct the electricity from the electric meter 614 (and associated circuit protection devices) to a plug 171 from the Vehicle 101 which is inserted into the outlet 111 of the Self-Identifying Power Source 116. There are numerous outlet conductor configurations which are specified by regulatory agencies, such as the National Electric Manufacturers Association (NEMA), for various voltages and current capacities, and a typical implementation could be a 2-pole 3-wire grounding outlet to reduce the possibility that the plug which is connected to the vehicle would be inadvertently disconnected from the Self-Identifying Power Source 116. Alternate means of identification include GPS 530, 535, RFID, or Bluetooth, which could also directly communicate the identity of the associated outlet to the vehicle for further communication to the Utility Service Center 100.

The Self-Identifying Outlet 610 of the Self-Identifying Power Source 116 includes an outlet identification device 612 which transmits outlet identification data to the Vehicle 101. This outlet identification data represents a unique code which identifies this particular Self-Identifying Outlet 610 of the Self-Identifying Power Source 116 in order for the owner of the associated electric meter 614 to receive credit for the energy consumption associated with the present vehicle battery recharging process. This outlet identification data can be transmitted over the power conductors or can be wirelessly transmitted to the vehicle by the outlet identification device 612, or may constitute an RFID solution where the vehicle reads the RFID code embedded in RFID device 613 located in the Self-Identifying Outlet 610 of the Self-Identifying Power Source 116. In addition to the unique identification of the Self-Identifying Outlet 610 of the Self-Identifying Power Source 116, the data can indicate the mode of data transmission appropriate for this locale. Thus, the vehicle may be instructed via this locale data to wirelessly transmit the accumulated energy consumption data to a local premises server for accumulation and forwarding to the utility company, or wirelessly via a public Communication Network 150 directly to the utility company, or via the power conductors 163 to a communications module associated with the electric meter 614, or to the utility company 155 via the Electric Power Grid 160.

In operation, every time a mating plug is inserted into the outlet 111 of the Self-Identifying Power Source 116 or the Vehicle 101 "pings" the Self-Identifying Outlet 610, the outlet identification device 612 outputs the unique outlet identification data or the RFID Device 613 provides a passive identification read capability to enable the Vehicle 101 to uniquely identify the Self-Identifying Outlet 610 of the Self-Identifying Power Source 116.

In addition, a power switch 611 can optionally be provided to enable the utility company 155 to disable the provision of power to Vehicle 101 pursuant to the authorization process described below. Switch 611 can be activated via a power line communications session with the utility company 155 via the Electric Power Grid 160. Alternatively, this switch could be "virtual" and located in the vehicle itself where the vehicle does not permit charging to occur even though the outlet 111 may be "hot" or have power to it.

Power Source Identification—Electric Power Grid Interconnect Level

A second implementation of the power source identification is at the Electric Power Grid interconnect 620 level, where the self-identifying element comprises one or more identification devices associated with the electric meter 614. Since each premises is equipped with an electric meter 614 required by the utility company and one or more disconnect devices 622 to serve one or more outlets 610, the identification of a utility meter as the Electric Power Grid interconnect is sufficient data to enable the utility company to credit the premises owner with the power consumed by Vehicle 101. Since the Vehicle 101 self-meters, for billing purposes it is irrelevant which outlet 111 serves to provide power to the Vehicle 101. The energy consumption session, as described in more detail below, is not dependent on the exact physical connection of Vehicle 101 to an outlet 111, but can be managed at the power grid interconnection 620 level.

Thus, meter identification device 621 transmits meter identification data to the Vehicle 101. This meter identification data represents a unique code which identifies this particular electric meter 614 of the Self-Identifying Power Source 116 in order for the owner of the associated electric meter 614 to receive credit for the energy consumption associated with the present vehicle battery recharging process. This meter identification data can be transmitted over the power conductors, or can be wirelessly transmitted to the vehicle by the meter identification device 621, or may constitute an RFID solution where the vehicle reads the RFID code embedded in RFID device 623 located in the power grid interconnect 620 of the Self-Identifying Power Source 116. Alternatively, GPS using a differential mode having very high accuracy could also be used to cross-correlate vehicle location and plug location. In addition to the unique identification of the power grid interconnect 620 of the Self-Identifying Power Source 116, the data can indicate the mode of data transmission appropriate for this locale. Thus, the vehicle may be instructed via this locale data to wirelessly transmit the accumulated energy consumption data to a local premises server for accumulation and forwarding to the utility company, or wirelessly via a public Communication Network 150 directly to the utility company, or via the power conductors 163 to a communications module associated with the electric meter 614, or to the utility company 155 via the Electric Power Grid 160.

Power Source Identification—Premises Level

The recharging process to include billing and crediting is not necessarily dependent on meter 614 shown in FIG. 6. For example, a third embodiment involves an intelligent identification communication architecture communicated via Power Line Carrier (PLC) communication from Utility Company 155 to Electric Power Grid 160 which ultimately arrives at each and every outlet in the universe of the Electric Power Grid 160. This intelligent Outlet ID is communicated directly to outlet 111 (not shown directly on FIG. 6) wherein each outlet has a unique ID as identified and managed by the Utility 155. This Power Line Carrier ID communication goes directly from Utility Company 155 to Electric Power Grid 160 via Utility Interface 114 to Vehicle 101 to PLC Communication Module 560 (shown in FIG. 5).

A fourth implementation of the power source identification is at the premises level, where the self-identifying element comprises one or more identification devices (such as RFID device 633) associated with the physical premises served by one or more power grid interconnects 620. Since a plurality of electric meters 614 can be used to serve a plurality of outlets 111 located at a physical facility, the granularity of identifying the owner of the facility is sufficient to implement the energy consumption credit process as described herein. Thus, Vehicle 101 can sense an RFID device 633 upon entry into the facility at which the outlet 111 is located and use the RFID data, as described above, as the utility company customer identification, since Vehicle 101 self-meters its energy consumption.

Vehicle Infrastructure

Figure 4:
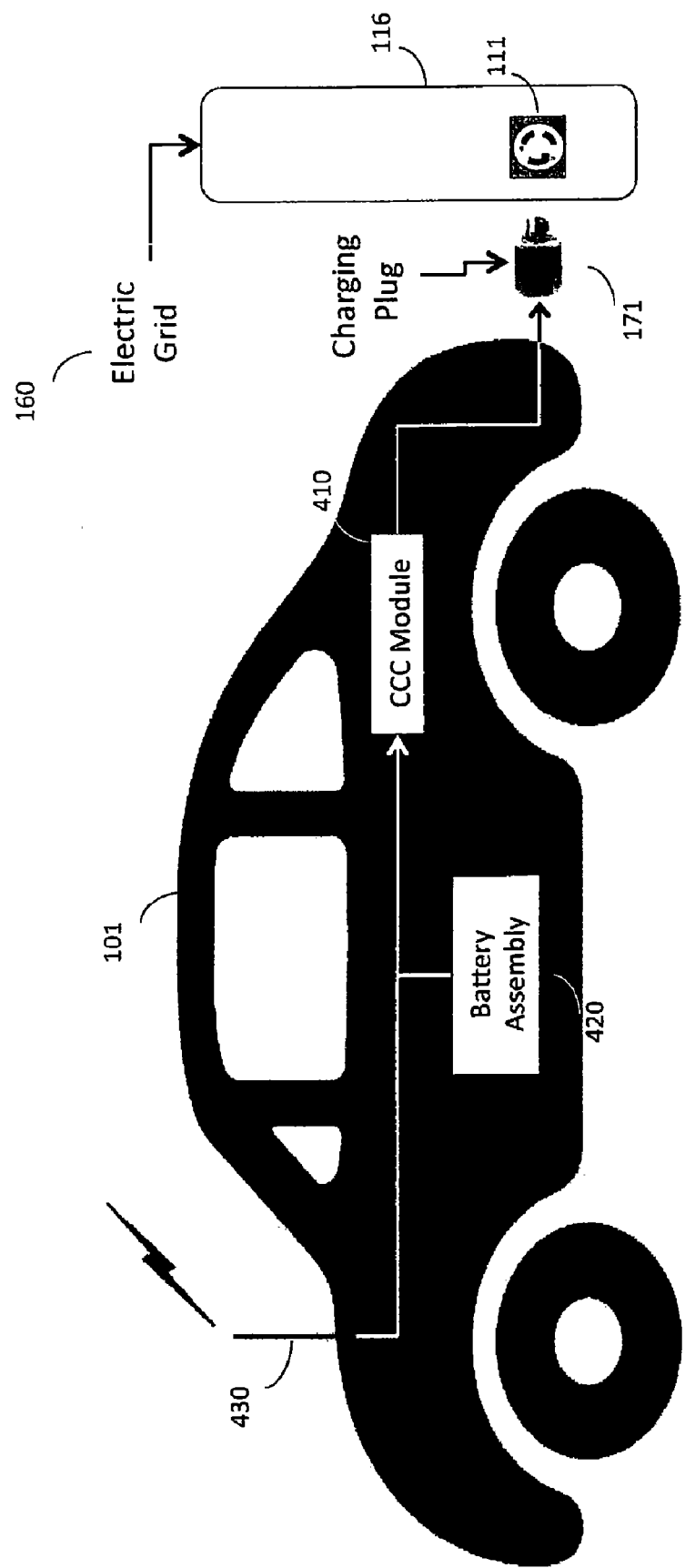
FIG. 4 illustrates, in block diagram form, the Charging, Control, and Communicator (CCC) module installed in a vehicle.

FIG. 4 illustrates, in block diagram form, the Charging, Control, and Communicator (CCC) module 410 installed in a vehicle; and FIG. 5 illustrates, in block diagram form, a detailed block diagram of the CCC module 410. The Vehicle 101 is equipped with an electrically powered propulsion system and vehicular battery banks 420 (or any such device that can store electrical energy). Presently, each outlet that is served by a local utility company is connected to the Electric Power Grid 160 by a utility meter 614 housed in Utility Interface 114 which measures the energy consumption of the loads that are connected to the outlet. The utility company bills the owner of the premises at which the outlet is installed for the total energy consumption for a predetermined time interval, typically monthly. Recharging a vehicle which is equipped with an electrically powered propulsion system results in the premises owner being billed for the recharging and the vehicle owner not being billed.

The present paradigm is to place the "electric meter" in the vehicle itself to eliminate the need to modify the Electric Power Grid. As shown in FIG. 6, the present Self-Identifying Power Source 116 provides the vehicle's electric meter with a unique identification of the outlet 111 to enable the vehicle to report both the vehicle's energy consumption and the point at which the energy consumption occurred to the utility company via the ubiquitous communications network. The consumption can be reported for each instance of connection to the Electric Power Grid, or the Vehicle can "accumulate" the measure of each energy consumption session, then periodically transmit energy consumption information along with the associated unique outlet identification data to the power company or a third party billing agency via the communication network. Alternatively, transmission of these signals to the power company via power lines is a possibility (Power Line Carrier). Another mode of billing is for the vehicle to be equipped with a usage credit accumulator which is debited as power is consumed to charge the vehicle's battery. The credit accumulator is replenished as needed at predetermined sites or via WiFi/Cellular or via Power Line Carrier.

The Charging, Control, and Communicator (CCC) module 410 is shown in additional detail in FIG. 5. The Vehicle 101 is equipped with either an inductive coupler (not shown) or a plug 171 to enable receipt of electric power from the Self-Identifying Power Source 116. Plug 171 is constructed to have the proper number and configuration of conductors to mate with Self-Identifying Power Source 116 in well-known fashion. These conductors are connected to meter 570 which measures the energy consumption of the circuitry contained in Charging, Control, and Communicator module 410. The principal load is converter module 550 which converts the electric voltage which appears on the conductors of plug 171 into current which is applied to battery assembly 420 thereby to charge battery assembly 420 in well-known fashion. The Processor 580 could call for a quick charge at a higher amperage, provided the Utility permits it; or the Processor 580 could call for a "trickle charge" over a number of hours. Processor 580 regulates the operation of the charging module to controllably enable the charging of the battery assembly 420 (or such device that can store electrical energy) and to provide communications with the Utility Service Center 100. In particular, the processor 580 receives the unique identification data from Self-Identifying Power Source 116 once the plug 171 is engaged in Self-Identifying Power Source 116, or via wireless means such as using RFID without an actual physical connection as previously discussed, and then initiates a communication session with Utility Service Center 100 to execute the AAA process as described herein. The communications with the Utility Service Center 100 can be in the wireless mode via antenna 430, or a wired connection 520, or via the conductors of the plug 171. An RFID reader 575 is provided to scan RFID devices associated with the outlet/electric meter/premises to which Vehicle 101 is sited to recharge battery assembly 420 as described herein. Finally, the ID communication can also be via PLC across the grid from the Utility wherein the Utility has, through its vast PLC network overlaid on its Electric Power Grid, created a unique ID for each Outlet, where a given ID is communicated from plug 171 to PLC Communication Module 560. Given the grid is also a communication network with intelligence means any given outlet can have its ID dynamically modified per operational requirements of the Utility.

In addition, processor 580 is responsive to data transmitted from the Utility Service Center 100 to either activate or disable the converter module 550 as a function of the results of the AAA process. Once the charging process is completed, the processor 580 reads the data created by meter 570 and initiates a communication session via communications module 540 with the Utility Service Center 100 to report the identity of Vehicle 101, the energy consumption in the present recharging session, and the associated unique identification of Self-Identifying Power Source 116 thereby to enable the utility company to credit the owner of Self-Identifying Power Source 116 and also bill the vehicle owner.

Energy Consumption Billing Process

Figure 3:
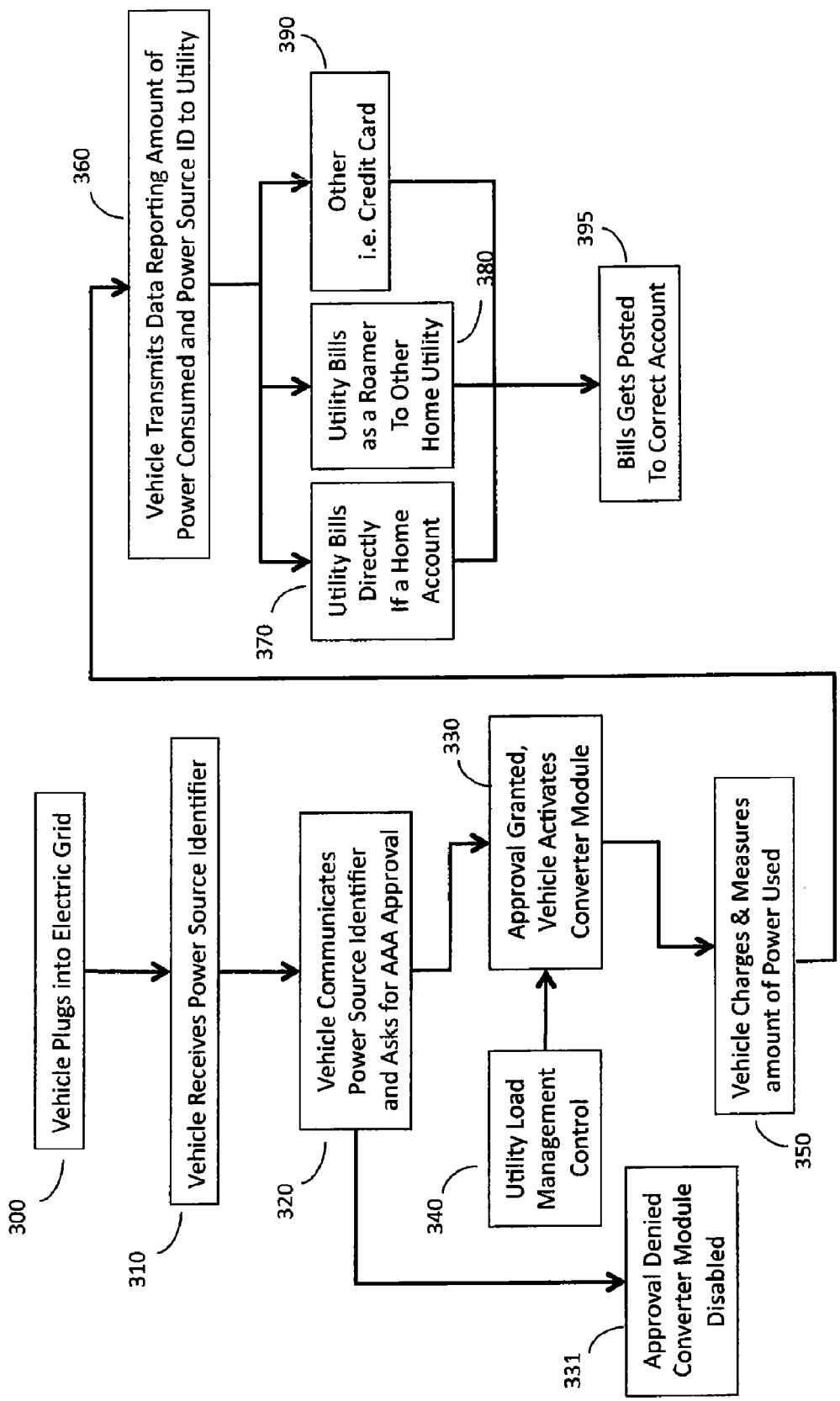
FIG. 3 illustrates, in flow diagram form, the operation of the billing system for the E-Grid system.
Figure 7:
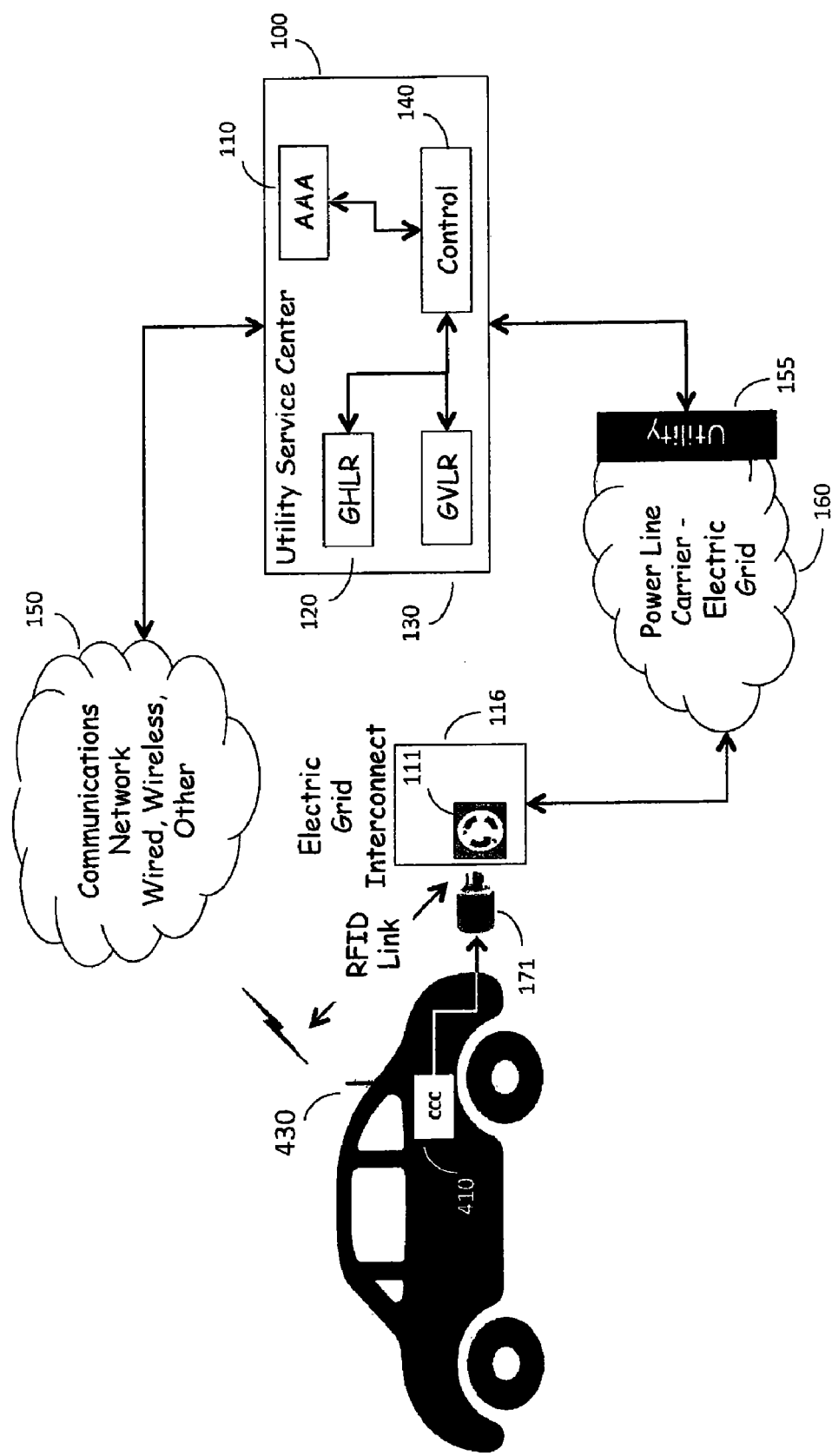
FIG. 7 illustrates, in block diagram, form the communications interconnections in use in the E-Grid network.

FIG. 3 illustrates, in flow diagram form, the operation of the billing system for the E-Grid system; and FIG. 7 illustrates, in block diagram form, the communications interconnections in use in the E-Grid network. For example, Vehicle 101 at step 300 plugs into outlet 111 of Self-Identifying Power Source 116 and at step 310 receives the Self-Identifying Power Source 116 identification information as described above, such as via an RFID link. At step 320, processor 580 accesses Communication Network 150 (or Power Line Carrier and Electric Power Grid 160) to communicate with Utility Service Center 100 and register on Grid Home Location Register 120 (or Grid Visitor Location Register 130). Vehicle 101 either is denied service at step 331 by Utility Service Center 100 due to a lack of credit, or lack of verification of identity, or gets authorization at step 330 from AAA System 110 to recharge the vehicle batteries 420. As a part of the communication process, processor 580 communicates all of the "Utility Centric" data it derived when it plugged into the Self-Identifying Power Source 116 as described above (utility name, location of charging outlet, and so on). As one means for managing possible charging fraud, the location of the charging jack could be cross-correlated with a GPS location (where a GPS module could be inserted into CCC Module 410 shown as elements 530 and 535 further connected to the Telecon Module 540).

An electrical power meter 570 inside the Vehicle 101 measures the amount of energy being consumed at step 350. When the plug 171 is pulled at step 360, and charging is complete, the meter in Vehicle 101 initiates a communication session via communication module 540 with the Utility Service Center 100 to report the identity of Vehicle 101, the energy consumption in the present recharging session, and the associated unique identification of Self-Identifying Power Source 116 thereby to enable the utility company to credit the owner of Self-Identifying Power Source 116 and also bill the vehicle owner. In addition, the vehicle owner can be charged for the energy consumption via their home account at step 370, or via a roamer agreement at step 380, or via a credit card at step 390. At this point, if there were a property owner revenue share, this would also be recorded as a credit to that given property owner, and all billing is posted to the proper accounts at step 395. In addition, at step 360, the Utility Service Center 100 compiles the collected load data and transmits it to the local utility (155 on FIG. 1 and 233, 234 on FIG. 2) to enable the local utility at step 340 to implement load control as described below.

A Simplified Communications Block Diagram—FIG. 7

In order to remove some of the architecture complexity, and to clearly describe the core invention in a slightly different manner) a minimalist figure (FIG. 7) was created to show the key building blocks of the E-grid system communication architecture. There are two key architectural elements that enable the system described herein: (1) the placement of the meter, which measures the power consumption during the charging sequence, in the vehicle itself; and (2) the addition of the Utility Service Center 100 to manage Authentication, Authorization, and Accounting, where Utility Service Center 100 enables any electrical outlet to be available for charging and enables any utility to be a "member" of the "E-grid" system. Shown in FIG. 7, a bidirectional communication network is created between the CCC (Charging, Control, and Communicator) Module 410 via Communications Network 150 and/or via Power Line Carrier via Electric Power Grid 160 to the Utility Service Center 100. Within the CCC Module 410 is a meter 570 that measures the power consumed during a charging cycle, and it communicates the amount of energy consumed via CCC Module 410 to antenna 430 via Communications Network 150 or Plug 171 via Electric Power Grid 160 ultimately to Utility Service Center 100. CCC Module 410 also receives the Self-Identifying Power Source 116 identification of the outlet 111 via RFID 613 and RFID Reader 575. The pairing of the unique Outlet ID with the energy consumed and measured by the vehicle are transmitted to the Utility Service Center 100 and enables billing of the owner of the vehicle (or account holder for the vehicle), crediting of the owner of the physical plug (jack) where the power was taken from, and correct payment to the utility that supplied the energy.

Using the Stored Energy in the Vehicle Batteries as a Peaking Source of Power for the Utility As shown in FIG. 1, Vehicles 101, 102 are able to charge from the Electric Power Grid 160 via conductors 163, and are also able to "push" energy back to the Electric Power Grid 160 via conductors 163. Similarly, in FIG. 2, Vehicles 291-295 are able to charge from the Electric Power Grids 240, 250 via conductors 271-275, and are able to "push" energy back to the Electric Power Grids 240, 250 via conductors 271-275. This "pushing" of energy from the vehicles' energy storage systems, whether they are batteries or some other form of energy storage device, permits the utilities to manage peak loads on the network by using the collective energy of all of the vehicles then connected to the E-Grid as "peak power sources", and it would diminish the need for utilities to build "Peaking Power Plants", which are very expensive to build and very expensive to operate, to handle the infrequent times when they need more energy to be supplied to the grid to prevent brownouts and blackouts.

Centralized Vehicle Load Management

Figure 8A:
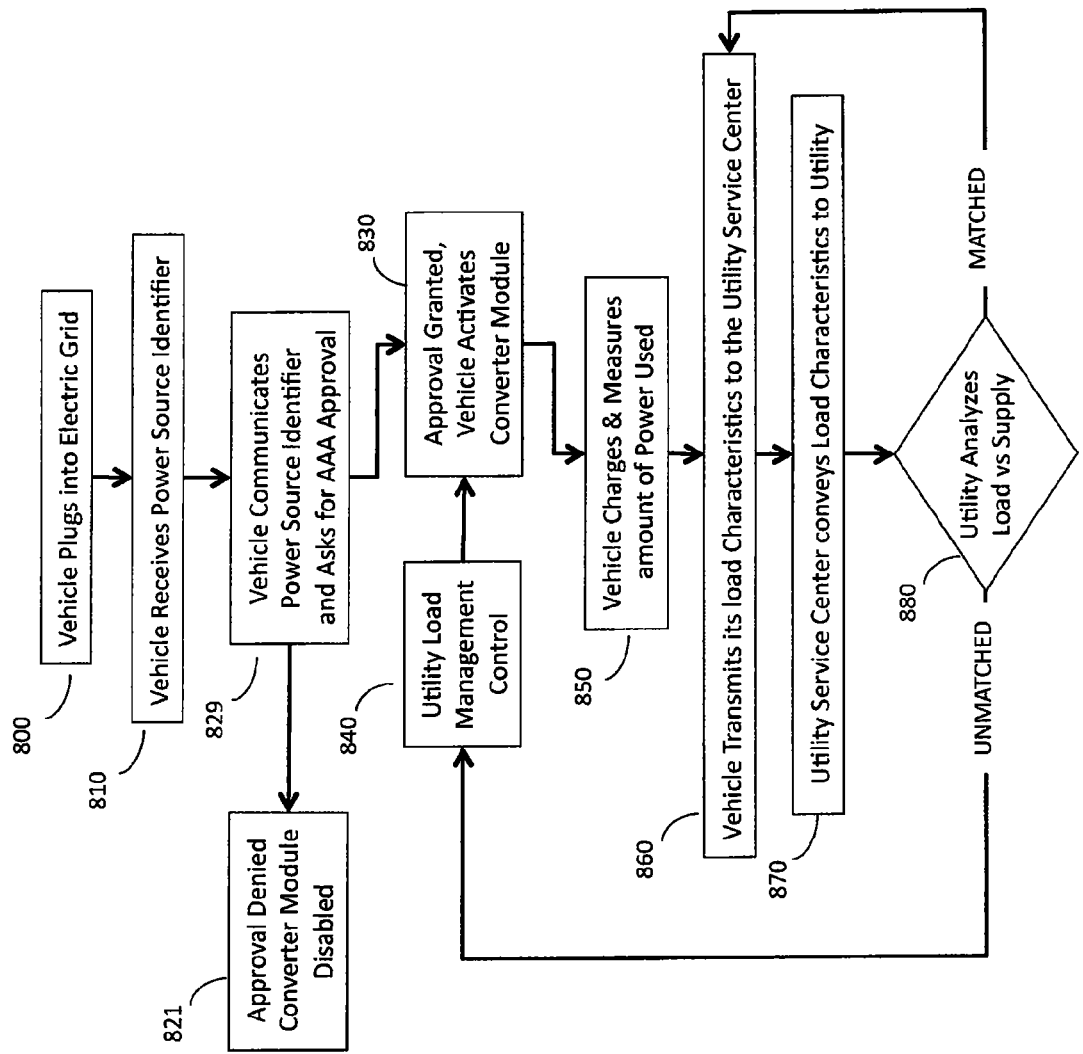

FIG. 8A illustrates, in flow diagram form, operation of the Centralized Vehicle Load Management System 180. The Utility Service Center 100 is the communication origination point for a Network-Wide Load Management situation where the Utility 155 directs CCC module 410 how to behave during a load management situation, and which vehicles, such as Vehicles 101 and 102 of FIG. 1 or Vehicles 291-295 of FIG. 2, can be controlled to temporarily stop charging or reduce their rate of charging, where Utility Service Center 100, as commanded by the Centralized Vehicle Load Management System 180, in cooperation with Utility 155, operates as a composite system in a closed loop fashion. Thus, some of the components of the Centralized Vehicle Load Management System 180 described herein may be located in the Utility Service Center 100 or the Utility 155.

At step 800, Vehicle 101 plugs into the Electric Power Grid 160 in an already described fashion. At step 810, Vehicle 101 receives the power source identifier via Power Line Carrier, RFID identifier, or GPS location (typically differential GPS to realize the required resolution), and transmits this unique location identification information to the Centralized Vehicle Load Management System 180. At this point, the Centralized Vehicle Load Management System 180 knows that there is a vehicle plugged into outlet or location "XYZ", for example, and the Centralized Vehicle Load Management System 180 forwards this data to the Utility 155 so that it can now be mapped into the overall "grid" map of all load sources. At step 829, Vehicle 101 asks for AAA approval from the Utility Service Center 100. At step 821, if charging approval is denied, the convertor module 550 in Vehicle 101 is disabled (conceptually, this would occur during an already high peak load situation), or it could be because the owner of that particular vehicle hasn't paid their vehicle charging utility bill and is in arrears, or maybe the neighborhood where the plug is located is experiencing technical difficulties and the plug is simply not available for charging (the load levels are OK but there is a technical default). After obtaining approval at step 830, Vehicle 101 activates the convertor module 550 located inside the vehicle. At step 850, the vehicle's battery 420 begins its charging sequence as defined by commands from Utility Service Center 100 and locally measures the power (or energy) downloaded to the battery 420 via meter 570 which stores data indicative of the amount of energy being used to recharge the batteries and then communicates the determined amount via antenna 430 back to the Centralized Vehicle Load Management System 180 at Utility Service Center 100 for ultimate billing purposes (step 860). At step 870, the Centralized Vehicle Load Management System 180 conveys the present load management characteristics to the Utility 155, which, at step 880, analyzes the state of overall supply versus load and makes two decisions—"matched" and "unmatched". If "matched", the process flow goes back to step 860; if "unmatched", the process flow goes back to step 840.

While this aforementioned process is "simple" in its conceptual description, there are many pathways the process can take. FIG. 8B describes another load management algorithm that could be concurrently operating with FIG. 8A, or it could be operating on its own as a stand-alone paradigm. Neither FIG. 8A or 8B are meant to suggest that these are the only methods, processes, or paradigms that could be used for Centralized Vehicle Load Management.

The Centralized Vehicle Load Management System 180 at step 881 records the identity of the vehicle, its load, and location data when this information is received from the vehicle as it registers to receive authorization to recharge its batteries. The Utility 155 typically has a plurality of Electric Power Grid Management Points, each of which is a physical point of the Electric Power Grid, at which the present load on the Electric Power Grid is measured. Typical Electric Power Grid Management Points include feeders, distribution points, etc. At step 882, the Utility 155 associates the vehicle location with an associated Electric Power Grid Management Point (or plug-in). The vehicle's presented load then is correlated with the other loads (both vehicle-based and non-vehicle-based) presented to and served by the identified associated Electric Power Grid Management Point as measured at step 883. The Utility 155 at step 884 scans the various Electric Power Grid Management Points and identifies those which are in an overload condition (or have exceeded a predetermined threshold). The overload condition of various Electric Power Grid Management Points typically is managed by analyzing the load presented to the Electric Power Grid at the overloaded Electric Power Grid Management Point as well as the loads presented at hierarchically junior Electric Power Grid Management Points of the Electric Power Grid which feed into the overloaded Electric Power Grid Management Point. The remediation of an overload condition can be handled in many ways, but typically the lowest level in the hierarchical Electric Power Grid would be addressed first, since overloads at the lower levels of the Electric Power Grid frequently also result in overloads at higher levels in the hierarchical structure of the Electric Power Grid. In addition, the magnitude of the load presented at each Electric Power Grid Management Point, even if it is not an overload condition, typically is considered so that the most heavily loaded Electric Power Grid Management Points are targeted for load reduction. In addition, the Centralized Vehicle Load Management System 180 can concurrently manage loads presented at numerous Electric Power Grid Management Points, whether overloaded or not, to remediate an overload condition at an identified Electric Power Grid Management Point, as instructed by the Utility 155.

Once the overloaded Electric Power Grid Management Points are identified at step 884, the Utility 155 scans the memory in which the vehicle location and associated Electric Power Grid Management Point data is stored to identify the vehicle loads at step 885 which are connected at or downstream of each identified overloaded Electric Power Grid Management Point. The vehicles identified at step 885 then are processed in a vehicle selection process at step 886, including, for example, removing vehicles which are identified as uninterruptable from consideration in the load shedding process. There is typically a mapping algorithm that maps the geographic position of the vehicle charging device (via GPS) or via the Grid Identifier (such as RFID or Power Line Carrier identification) passed along by the Vehicle to an associated Electric Power Grid Management Point. The Utility 155 knows that Vehicles 101 and 102, for example, are in a region that is experiencing very heavy electrical demand. So, to help manage the demand, the Utility 155 selects vehicle loads which are determined to be "shedable" and sends a command at step 887, via Communication Network 150 (or via PLC across Electric Power Grid 160 to Utility Interface 114, or via wireless commands via Network 150), to the Centralized Vehicle Load Management System 180, which transmits this data to the selected Vehicles 101, 102 to instruct Vehicles 101, 102 to temporarily stop charging (or until demand is lighter to re-initiate the charging sequence). Alternatively, the vehicles could be instructed to continue their charging sequence but charge at a lower level, or a given vehicle could ask for permission to charge at a very high rate to reduce the charge time.

At step 888, the Utility 155 determines from the measurements taken at the overloaded Electric Power Grid Management Point whether these actions have remediated the overload. If they have, the process advances to step 889 where the Utility 155 determines whether there are additional overloaded Electric Power Grid Management Points in the network. If so, the Centralized Vehicle Load Management process returns to step 885, where another Electric Power Grid Management Point is selected for action. If not, processing advances to step 881 to the beginning of the load management process.

If, at step 888, the overload is not remediated, the Centralized Vehicle Network Load Management process advances to step 890 and determines the power available for retrieval from the storage batteries located in the vehicles identified at step 885 or step 886. At step 891, the Utility 155 selects at least one vehicle from the group of vehicles identified at step 885 or 886 to transfer power from its storage batteries onto the Electric Power Grid. The Utility 155 determines from the measurements taken at the overloaded Electric Power Grid Management Point whether these actions have remediated the overload. If they have, the process advances to step 889 where the Utility 155 determines whether there are additional overloaded Electric Power Grid Management Points in the network. If so, the Centralized Vehicle Network Load Management process returns to step 885, where another Electric Power Grid Management Point is selected for action. If not, processing advances to step 893 to an optional process step in the load management process where one or more alternative load management remedies are activated (such as natural gas fired Peaking Plants). Once these alternative actions are executed, processing returns to step 889 where the Utility 155 determines whether there are additional overloaded Electric Power Grid Management Points in the network. If so, the Centralized Vehicle Network Load Management process returns to step 885, where another Electric Power Grid Management Point is selected for action. If not, processing advances to step 881 to the beginning of the load management process.

SUMMARY

The Centralized Vehicle Load Management System 180 architecture enables the direct and ubiquitous connection to the vehicular charging system architecture for seamless and adaptive power load management control from a central location (the utility's existing load management system) which uses a unique identification of an outlet to a vehicle which is connected to the outlet to enable the vehicle to report via wired and wireless means the vehicle's power consumption to the utility company to enable the utility company to control the charging process of the battery based on the centralized state of the overall electrical load presented to the utility, as well as concurrently bill the vehicle owner and credit the outlet owner for the power consumed by the recharging of the vehicular battery banks.

What is claimed as new and desired to be protected by Letters Patent of the United States is:

1. A method for enabling a utility company, which operates an electric power grid, to controllably provide power to recharge a plurality of vehicles, each vehicle including a propulsion system powered, at least in part, by electric power, at least some of which is stored onboard the vehicle in an electric power storage apparatus, comprising:

uniquely identifying a determinable location at which each of a plurality of vehicles served by said electric power grid is presently connected to the electric power grid via a corresponding electric outlet;

identifying at least a present electric power load presented by each of the plurality of vehicles to said electric power grid at said determined location;

billing, in response to receipt of said determinable location identification and electric power load data from each vehicle, the owner of the vehicle for energy usage and also to credit the owner of the electric outlets associated with the determinable location for the energy usage billed to the owner of the vehicles; and controlling a subset of said plurality of vehicles to manage the flow of electric power said subset of vehicles draws from said electric power grid.

2. The method for controllably providing power to recharge a plurality of vehicles of claim 1 wherein said step of controlling comprises:

transmitting at least a portion of said location identification and electric power load data received from said plurality of vehicles to a utility company which serves said electric power grid; and receiving vehicle load control data from said utility company which defines said subset of said vehicles and data indicative of a flow of electric power said subset of vehicles is authorized to draw from said electric power grid.

3. The method for controllably providing power to recharge a plurality of vehicles of claim 2 wherein said step of controlling further comprises:

transmitting, in response to vehicle load control data received from said utility company, control instructions to said subset of vehicles to enable said vehicles to draw a predetermined amount of power from said electric power grid.

4. The method for controllably providing power to recharge a plurality of vehicles of claim 3 wherein said step of controlling further comprises:

regulating a power converter module, located in said vehicle, to control said electric power load presented to electric power grid by said vehicle.

5. The method for controllably providing power to recharge a plurality of vehicles of claim 2 wherein said step of controlling further comprises:

transmitting, in response to vehicle load control data received from said utility company, control instructions to vehicles not members of said subset of vehicles to disable said vehicles from drawing power from said electric power grid.

6. The method for controllably providing power to recharge a plurality of vehicles of claim 5 wherein said step of controlling further comprises:

disabling a power converter module located in said vehicle to prevent said vehicle from drawing electric power from said electric power grid.

7. The method for controllably providing power to recharge a plurality of vehicles of claim 1 wherein said step of identifying comprises:

transmitting data indicative of at least one of power required to recharge, recharge current handling capacity, estimated time of connection, amount of energy presently stored in the battery, or class of service for which the vehicle owner has contracted.

8. A system for enabling a utility company, which operates an electric power grid, to controllably provide power to recharge a plurality of vehicles, each vehicle including a propulsion system powered, at least in part, by electric power, at least some of which is stored onboard the vehicle in an electric power storage apparatus, comprising:

location definition means for uniquely identifying a determinable location at which each of a plurality of vehicles served by said electric power grid is presently connected to the electric power grid via a corresponding electric outlet;

load measurement means for identifying at least a present electric power load presented by each of the plurality of vehicles to said electric power grid at said determined location;

billing system for billing, in response to receipt of said determinable location identification and electric power load data from each vehicle, the owner of the vehicle for energy usage and also to credit the owner of the electric outlets associates with the determinable location for the energy usage billed to the owner of the vehicles; and charging control means for controlling a subset of said plurality of vehicles to manage the flow of electric power said subset of vehicles draws from said electric power grid.

9. The system for controllably providing power to recharge a plurality of vehicles of claim 8 wherein said charging control means comprises:

data reporting means for transmitting at least a portion of said location identification and electric power load data received from said plurality of vehicles to a utility company which serves said electric power grid; and load control data receiver means for receiving vehicle load control data from said utility company which defines said subset of said vehicles and data indicative of a flow of electric power said subset of vehicles is authorized to draw from said electric power grid.

10. The system for controllably providing power to recharge a plurality of vehicles of claim 9 wherein said charging control means further comprises:

load regulation data transmitter means for transmitting, in response to vehicle load control data received from said utility company, control instructions to said subset of vehicles to enable said vehicles to draw a predetermined amount of power from said electric power grid.

11. The system for controllably providing power to recharge a plurality of vehicles of claim 10 wherein said charging control means further comprises:

power converter control means for regulating a power converter module located in said vehicle to control said electric power load presented to electric power grid by said vehicle.

12. The system for controllably providing power to recharge a plurality of vehicles of claim 9 wherein said charging control means further comprises:

load regulation transmitting means for transmitting, in response to vehicle load control data received from said utility company, control instructions to vehicles not members of said subset of vehicles to disable said vehicles from drawing power from said electric power grid.

13. The system for controllably providing power to recharge a plurality of vehicles of claim 12 wherein said charging control means further comprises:

power converter control means for disabling a power converter module located in said vehicle to prevent said vehicle from drawing electric power from said electric power grid.

14. The system for controllably providing power to recharge a plurality of vehicles of claim 8 wherein said load measurement means comprises:

data reporting means for transmitting data indicative of at least one of power required to recharge, recharge current handling capacity, estimated time of connection, amount of energy presently stored in the battery, or class of service for which the vehicle owner has contracted.

* * * * *